Dec. 28, 1943. N. V. KUEHLMAN 2,337,667
FEED MECHANISM FOR ASSEMBLY MACHINES
Original Filed July 10, 1941 4 Sheets-Sheet 1

INVENTOR.
Norman V. Kuehlman
BY
ATTORNEYS

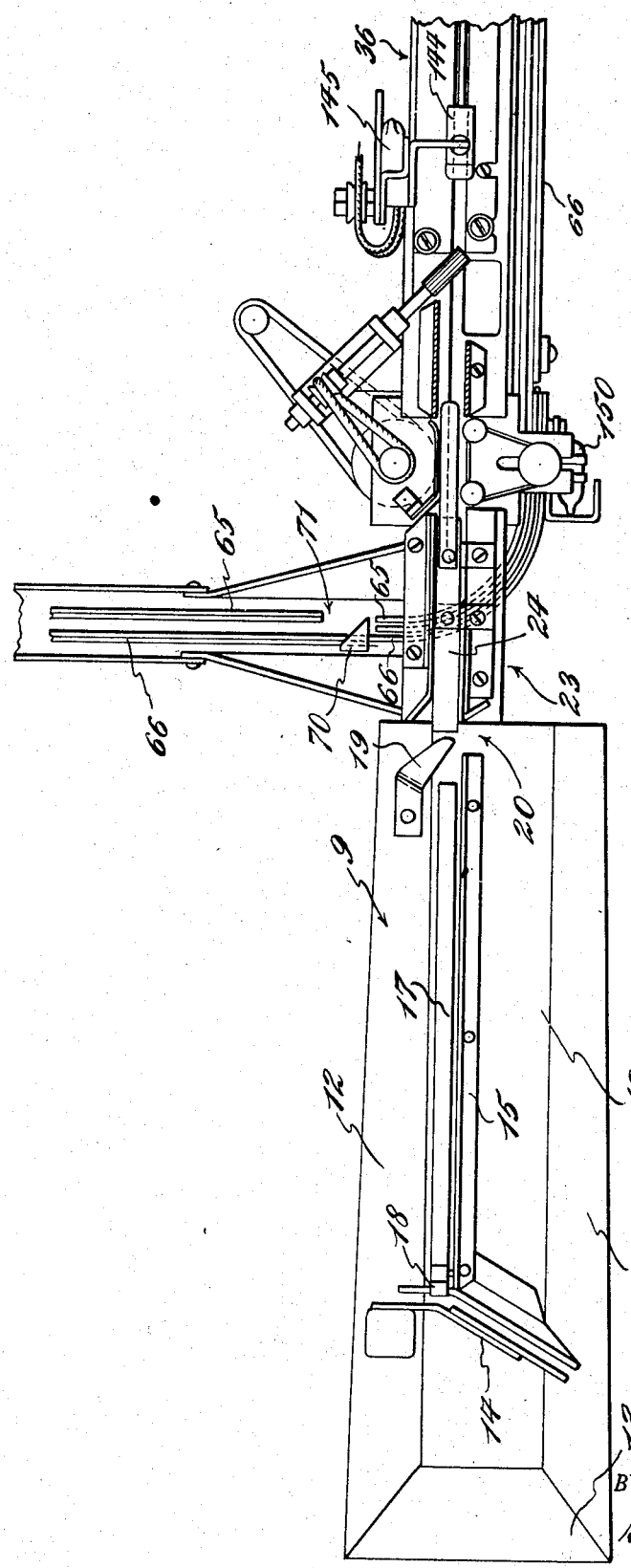

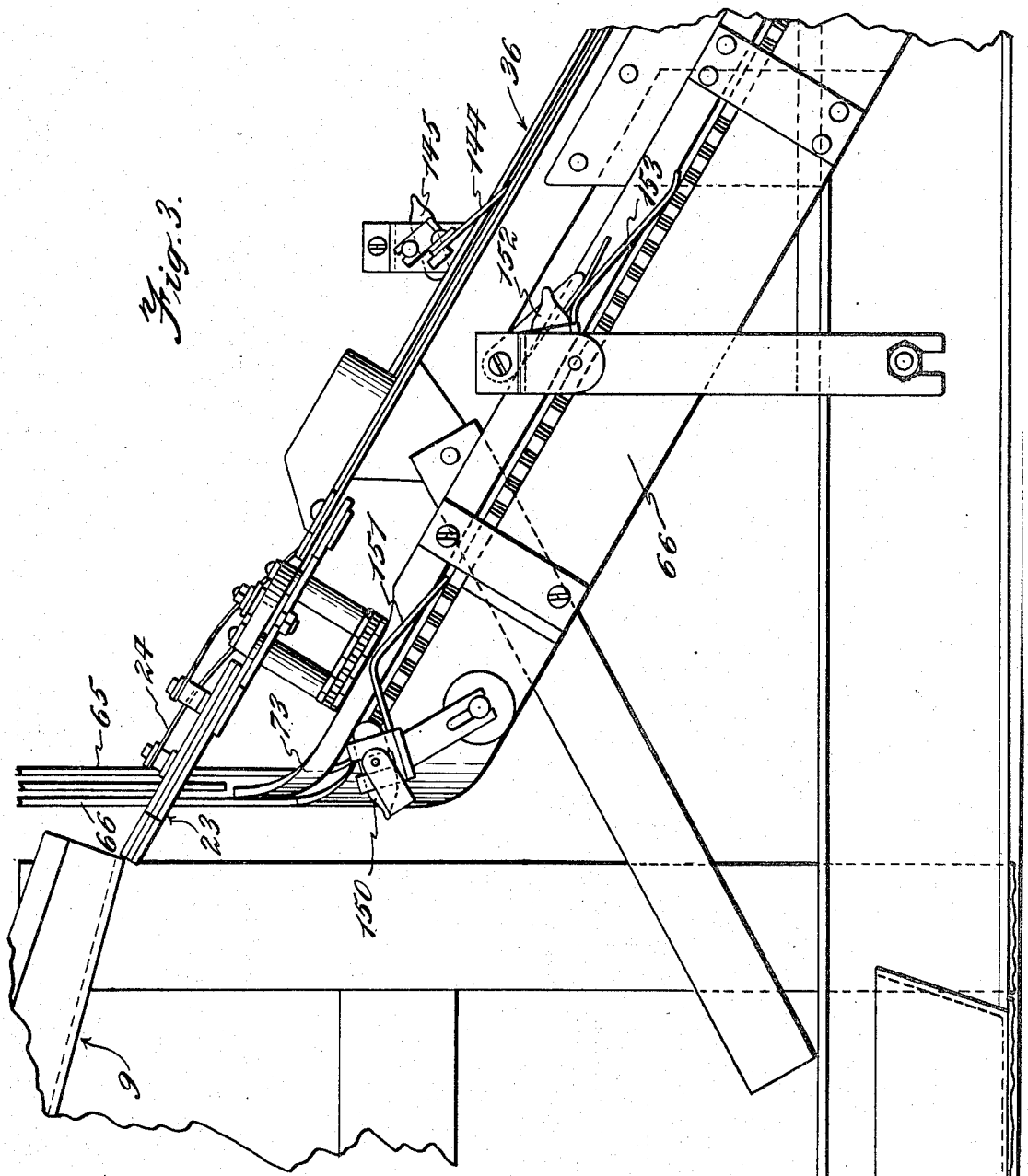

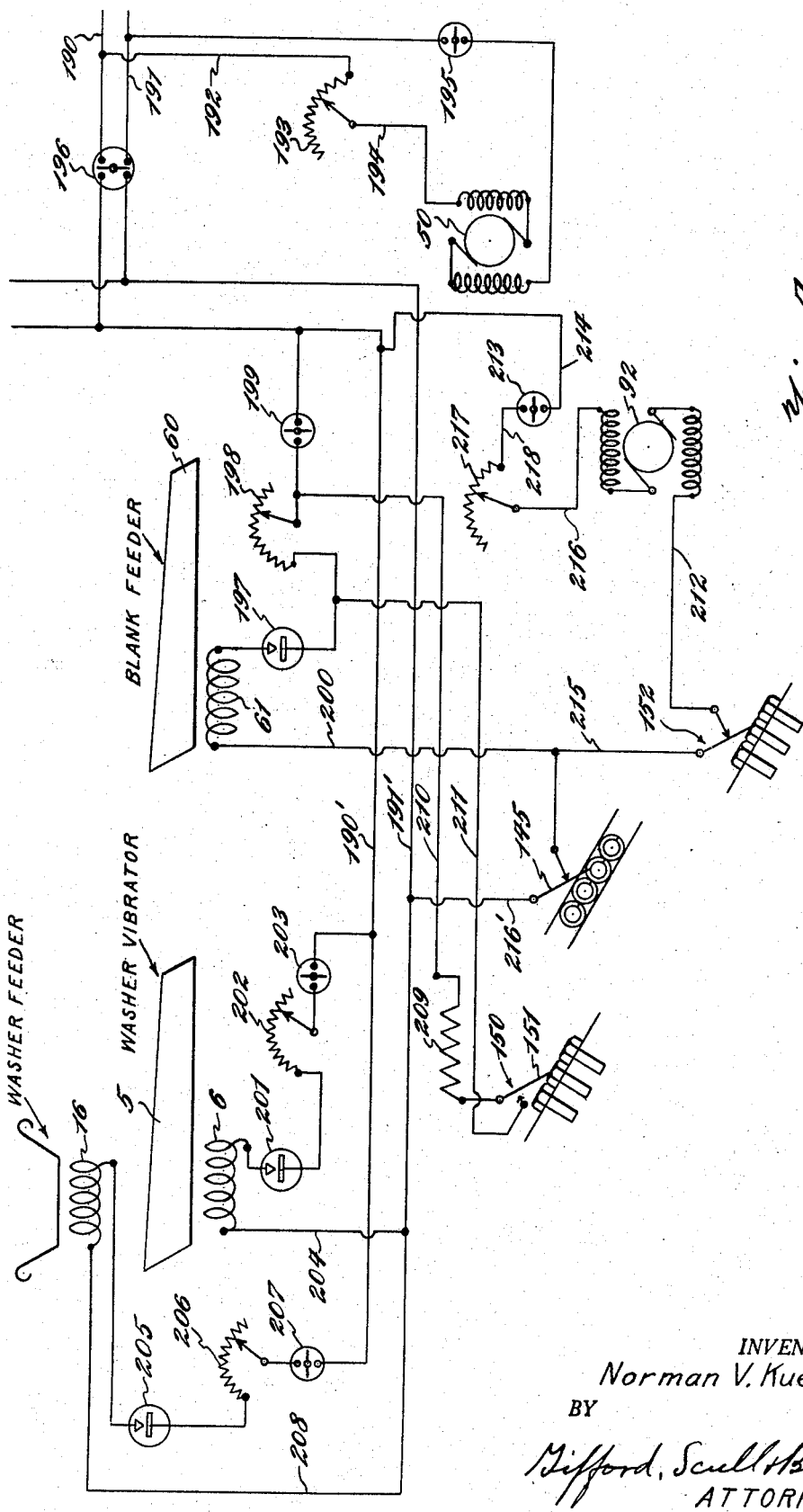

Patented Dec. 28, 1943

2,337,667

UNITED STATES PATENT OFFICE 2,337,667

FEED MECHANISM FOR ASSEMBLY MACHINES

Norman V. Kuehlman, Milwaukee, Wis., assignor to The National Lock Washer Company, Newark, N. J., a corporation of New Jersey Original application July 10, 1941, Serial No. 401,804. Divided and this application August 25, 1942, Serial No. 456,038

6 Claims. (Cl. 10—163)

This is a division of my application Ser. No. 401,804, filed July 10, 1941. The invention described and claimed herein is for a feed mechanism for automatically feeding an equal number of washers and bolt blanks from storage spaces of an assembly machine to an assembly mechanism which places the washers on the blanks.

Fig. 2 is a plan view of part of the paths of the washers and blanks leading from the storage spaces to the assembly mechanism.

Fig. 3 is a side elevation of part of the washer and blank tracks.

Fig. 4 is a diagram of the electric circuits of the assembly machine and its controls for the automatic feeding of the proper number of washers and blanks to the assembly mechanism.

Figure 1:
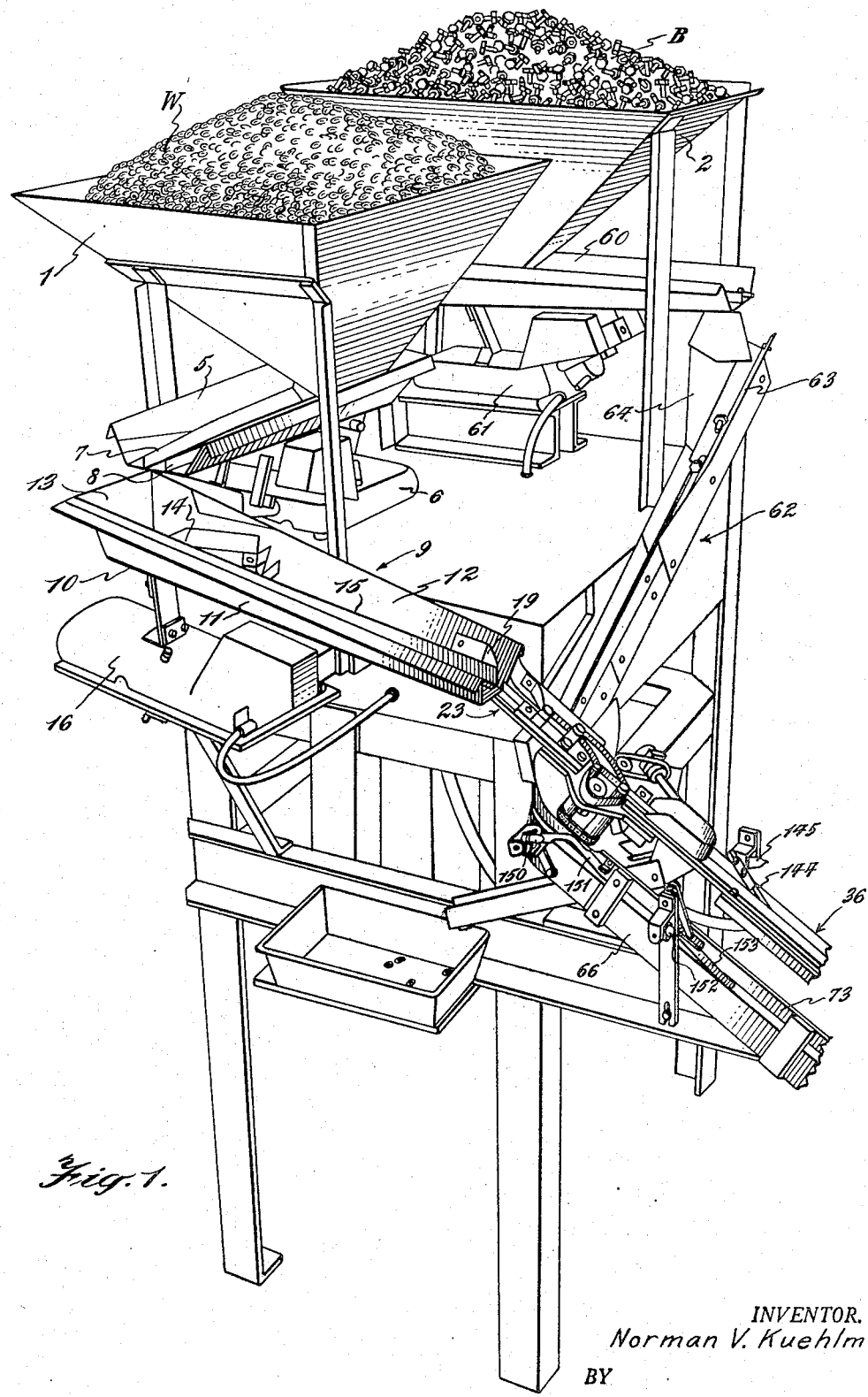
Fig. 1 is a perspective view of part of a washer and blank assembly machine.

Fig. 1 shows suitable storage spaces for washers and blanks. The hopper 1 is provided to receive a quantity of lock washers W which, in the illustrative drawings, are of the split-ring type, and a similar hopper 2 is provided to receive a quantity of bolt blanks B. These hoppers are shown in the form of inverted pyramids, but may be conical if so desired. From these hoppers, the washers and blanks are conveyed along similar paths, which will be described in detail, to an assembly mechanism (not shown), where they are put together to form the assembled blank and washer and from which they are discharged to a suitable storage space.

Lock washer hopper path

The bottom of the washer hopper 1 is equipped with two or more baffle plates designed to relieve the mechanism immediately under the opening at the bottom of the hopper from the full weight of the superimposed lock washers. These baffles are not shown because their use in any form of storage device is common.

Underneath the opening in the lowermost part of hopper 1 is a trough 5 which is positioned close enough to the opening in the bottom of the hopper to prevent a rapid and uncontrolled pouring out of the lock washers through that opening. The trough 5 is mounted upon a vibratory mechanism 6 which serves to vibrate said trough and in this way control the flow of the washers from the hopper. The vibrating mechanism shown is sold under the trade name "Syntron" and made under U. S. Letters Patent Nos. 1,637,401 and 1,637,717.

Washer flow control is obtained by adjusting the activity of the vibrator 6. This feature is utilized to control the flow of the lock washers from the hopper 1 into the track feeder 5.

The action of the vibrating track feeder 5 is such that the washers will move along it between suitable guides 7 and 8 to the open end thereof, from which they will fall into washer vibrator 9 (Figs. 1 and 2), which is made up of a flat bottom portion 10 and two sloping side portions 11 and 12. An end wall 13 closes the left or upper end of the vibrator (as viewed in the figures). The washer vibrator 9 slopes downwardly from the left to the right, as seen in these figures, and is equipped with a suitable baffle 14 and a guide 15 designed to direct and to some extent control the flow of the washers along this vibrator.

Like feeder 5, this trough-like washer vibrator 9 is supported upon a vibrating mechanism 16 which is similar to the mechanism 6. It is so adjusted and designed as to vibrate the member 9, to maintain a steady flow of washers along the length thereof. A light steel drag 17 is pivoted at 18 and designed to rest upon some of the washers in the vibrator 9 so as to steady their movement therealong. This washer vibrator is tilted, not only downwardly, as shown in Fig. 1, but also downwardly to the left, as viewed in the direction of travel of the washers, so that the washers will tend to move toward the wall 12 as well as longitudinally of the washer vibrator.

At the lower end of the vibrator 9 is a throwout finger 19 designed to guide rolling or tilted washers out through a discharge opening 20.

From the right or lower end of vibrator 9, those washers which do not come in contact with the finger 19 drop into a tilted chute or track 23. This chute is slightly wider and deeper than the washer. The top of the chute is furnished with another light steel drag 24 designed to rest lightly upon the washers to keep them in line, and the inclination of the chute 23 is such that the washers will move along it by gravity.

Bolt blank path of travel

Near the bottom of bolt blank hopper 2 are suitable baffles (not shown) to prevent the full weight of the blanks from being imposed upon the apparatus underneath the opening in the lowermost part of the hopper. Under this opening is positioned a blank vibrating feeder 60 mounted upon a vibrator 61 of the same general character as vibrators 6 and 16. Feeder 60 is positioned close enough to the bottom of the hopper 2 to prevent uncontrolled discharge of blanks. Blank flow control is obtained by adjusting the activity of the vibrator 61.

Feeder 60, as seen in Fig. 1, is open at the right end which is positioned above a blank-aligning trough 62. The upper end of trough 62 has wide V-shaped sides 63 and 64 which taper down and separate at the bottom thereof to form a track made up of two parallel vertically disposed rails or surfaces 65 and 66 (Figs. 2 and 3).

Members 65 and 66 are spaced apart a distance slightly greater than the diameter of the shank of the bolt blank B. When the blank drops from vibrator 60 into the trough 62, the V-shaped cross-section thereof serves to line up the blanks, and, as they pass downwardly and move from the trough onto that part of the blank path consisting of spaced parallel rails, the blanks will arrange themselves so as to be supported on their heads between the layers 65 and 66 and then travel downwardly by gravity along these layers. The open space between the layers allows dirt and other foreign matter, such as nails, wire, and chips, to fall out of the track.

As the blanks move down along the track to a position near the break 71 in the rail 65 (Fig. 2), they approach a blank selector 70, which need not be described herein except to say that it serves to discard improperly arranged or proportioned blanks and permits the passage of other blanks to that portion of the tracks 65 and 66 below the selector 70. Track 66 is not arranged in a vertical plane, but is slightly twisted so that properly arranged and proportioned blanks may support themselves on the upper edge of this track while passing across the gap 71. After the blank has passed the gap 71, it goes under a top rail 73 (Fig. 3). It continues to travel along the path indicated in Fig. 1 on the tracks 65 and 66 down to the assembling mechanism which is not shown. That portion of the tracks 65 and 66 which extends upwardly from the assembly mechanism for a short distance may be considered the blank reservoir.

Controls

It is desirable to control the flow of blanks and washers so that the same number of each will be delivered to the assembly mechanism in a given time and, in case of accident, it is desirable to stop the machine automatically. The illustrative machine is designed to perform these functions automatically. Various control devices may be used for this purpose and the preferred form will now be described.

As the washers move down through the washer reservoir 36, which extends just above the assembly device, they pass under a pivoted light spring finger 144. Finger 144 is connected to a mercury switch 145 so that, upon a very slight movement of the finger 144, switch 145 is tilted from the closed to the open position, or vice versa. When there is a washer under the end of finger 144, it is lifted sufficiently to maintain the mercury switch 145 in closed position, but when there is no washer under this finger, it falls enough to tip the mercury switch 145 and open the circuit therethrough. Switch 145 is connected in series with the motor (not shown) which drives the assembly mechanism, a similar blank feeder switch 152 and blank feeder vibrator 61, so that when there is no washer under the spring finger 144 the circuit through the assembly mechanism motor, switch 152, and blank feeder vibrator 61 is open. In ordinary running, absence of washers is usually momentary and consequently the motor only slows down for a short interval.

Another finger-operated mercury switch is arranged on the blank feed track at 150. This is operated by means of a spring finger 151 which rests lightly upon the blank heads passing thereunder. When there is a blank head under this spring finger 151 and therefore it is raised, the mercury switch 150 is in the "off" position; that is, the switch is open. This switch controls increased activity of the blank feeder vibrating mechanism 61. Normally, this vibrator is manually adjusted from a control panel to permit a rate of flow of blanks slightly lower than the rate at which the assembly device demands them. Consequently, the number of blanks in the reservoir will drop and at times there will be no blank under the finger 151 so that it falls, closing mercury switch 150. This completes the circuit which causes an increased supply of current to flow to the blank feeder vibrator 61 and therefore an increased supply of blanks will drop into the blank aligning chute. This extra supply of blanks again raises the finger 151 and opens the circuit through switch 150, thus cutting off the increased supply of current to the vibrator 61, permitting it to function in accordance with the normal manual control adjustment.

It has been found nearly impossible to adjust the flow of blanks and washers so that exactly the same number is fed to the assembly mechanism. Therefore the manual adjustment of the machine is such that fewer blanks than washers are fed to the assembly wheel or other assembly mechanism, but the difference is taken care of by this automatic feed, which produces an additional number of blanks sufficient to maintain the assembly mechanism supplied with a supply of blanks equal to the supply of washers.

Lower down on the blank reservoir is positioned mercury switch 152 controlled by a spring finger 153 which also rests on the heads of the blanks passing along the blank reservoir. This switch is very much like switch 145, because it is maintained in a closed position as long as the finger 153 is raised by the blank heads, but when the supply of blanks drops to the point where the spring finger 153 falls, then switch 152 is open. It is in circuit with the assembly mechanism motor and therefore will stop the assembly mechanism when open.

Electric circuit

Looking at Fig. 4, lines 190 and 191 connect with a source of power such as the commonly used 110-volt alternating current. Wire 192 is connected to line 190 and carries current to an adjustable rheostat 193 which is connected in series by means of wire 194 to a motor which drives certain mechanical elements for aligning the washers passing along the washer track and also for rejecting misaligned washers. This mechanism is not shown or described in detail in this application, but is represented diagrammatically at 50. A hand switch 195 is designed to make or break the circuit through motor 50.

A double throw hand switch 196 controls the current passing through the main lines 190 and 191 to the other part of the electrical system of the assembly machine. The main line connections from power lines 190 and 191 are shown at 190' and 191'. From these lines the various pieces of electric equipment receive their current.

The blank feeder 60 is designed to be vibrated by the vibrator 61 which is connected through a rectifier 197, an adjustable resistance 198, and a hand switch 199 to power line 190'. The other side of the vibrator is connected to power line 191' through wire 200 and switch 145.

Washer vibrator 5 is actuated by vibrator 6 connected on one side to power line 190' through rectifier 201, adjustable resistance 202, and hand switch 203, and on the other side to power line 191' through wire 204.

The washer feeder 9 is agitated by a vibrator 16 which is connected to power line 190' through rectifier 205, an adjustable resistance 206 and hand switch 207, and on the other side to power line 191' through wire 208.

Mercury switch 150 is connected in series with a resistance 209 (approximately ¾ the resistance of 198) and both the switch 150 and resistance 209 are connected in parallel with resistance 198 through lines 210 and 211. As pointed out heretofore, switch 150 is designed to remain open when there is a blank under its spring finger 151, but when the supply of blanks falls so low that there are no blanks under this switch, the finger 151 will drop, the switch will close and additional current will pass to vibrator 61, agitating the blank feeder 60 more rapidly and thus feeding more blanks.

Mercury switch 152 is connected in series through wire 212 with motor 92 which is designed to operate the assembly mechanism and this in turn is connected to rheostat 217 by line 216. The other side of rheostat 217 is connected to power line 190' through hand switch 213 by means of wires 218 and 214. The other side of switch 152 is connected by wire 215 to mercury switch 145 and vibrator 61. One side of switch 145 is connected to power line 191' by wire 216'.

Normally, with a sufficient supply of washers under switch 145, this switch remains closed and likewise switch 152 remains closed when there are blanks thereunder. When both of these are closed, motor 92 is connected into the circuit and operates. If, on the other hand, a supply of washers falls so low that there are none under the switch 145, then the assembly mechanism motor 92 and blank feeder vibrator 61 will be disconnected from the source of power. Opening of switch 152 will disconnect motor 92 only.

I claim:

1. In a machine of the character described, a washer storage means, a blank storage means, the combination of a washer track leading from said washer storage means, a blank track leading from said blank storage means, means for regulating the supply of blanks at a rate normally less than the normal rate of supply of washers from the washer supply means, and means operatively connected to said blank track and adapted to increase temporarily the rate of supply of blanks from the blank storage means to the blank track when blanks are absent on said blank track.

2. In a machine of the character described, washer storage means, blank storage means, a washer track leading from said washer storage means, a blank track leading from said blank storage means adapted to be supplied with blanks from said blank storage mechanism, means for regulating the supply of blanks at a rate normally less than the normal rate of supply of washers from the washer storage means, and means for increasing the rate of supply of the blanks temporarily and periodically to compensate for the normal rate of supply of blanks and washers so as to make an equal number of blanks and washers available.

3. In a machine of the character described, a washer storage means, a blank storage means, a washer track leading from said washer storage means, a blank track leading from said blank storage means, electrically actuated means for providing a supply of blanks at a rate less than the normal rate of supply of washers from the washer hopper, and an electric switch operatively connected at a point on the blank track remote from said blank hopper and adapted to be operated when there are no blanks thereunder to cause increased activity of said blank regulating supply means and to maintain said increased activity until the blanks in said blank track open said switch.

4. In a machine of the character described, a washer storage means, a blank storage means, a washer track leading from said washer storage means, a blank track leading from said blank storage means, means for regulating the flow of blanks along said blank track, means for regulating the flow of washers along said washer track, and means for automatically speeding up the flow of blanks when the number fed during normal operation is less than the number of washers fed during the same period of time.

5. In a machine of the character described, a washer storage means, a blank storage means, a washer track leading from said washer storage means and including a vibratory trough adjacent to the outlet of said washer storage means, a blank track leading from said blank storage means and including a vibratory trough adjacent to said blank storage means, manual means for adjusting the extent of vibration of said vibratory troughs so that the number of washers supplied to said washer track is greater than the number of blanks supplied to said blank track, means associated with said blank track for causing an increase of the vibratory motion of the trough located immediately underneath the outlet of said blank storage means to increase the flow of blanks when the number of blanks stored in the blank track falls below a predetermined number and for decreasing the activity of said vibratory element to its normal rate when the number of blanks in said blank track has increased to a certain predetermined number.

6. In a machine of the character described, washer storage means, blank storage means, a washer track leading from said washer storage means, a blank track leading from said blank storage means, means associated with each storage means for controlling the number of washers and blanks discharged into the washer and blank tracks from said storage means, means for regulating said control means to normally feed more washers than blanks to said tracks, and means associated with said blank track for causing a speedup in the activity of said blank feeding means when the number of blanks in position thereon drops below a predetermined number and for reducing said activity again to its normal rate when the number of blanks increases to said predetermined number.

NORMAN V. KUEHLMAN.